United States Patent
Lee et al.

(10) Patent No.: US 10,234,826 B2
(45) Date of Patent: Mar. 19, 2019

(54) WEARABLE DEVICE AND CONTROL METHOD THEREFOR

(71) Applicant: LG ELECTRONICS INC., Seoul (KR)

(72) Inventors: Yuri Lee, Seoul (KR); Hyeonhui Kim, Seoul (KR); Myeongsoo Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 15/528,022

(22) PCT Filed: Nov. 18, 2014

(86) PCT No.: PCT/KR2014/011062
§ 371 (c)(1),
(2) Date: May 18, 2017

(87) PCT Pub. No.: WO2016/080565
PCT Pub. Date: May 26, 2015

(65) Prior Publication Data
US 2018/0314212 A1     Nov. 1, 2018

(51) Int. Cl.
*G04G 19/00*     (2006.01)
*H02J 7/35*     (2006.01)
(Continued)

(52) U.S. Cl.
CPC .......... *G04G 9/0041* (2013.01); *G09G 3/002* (2013.01); *G09G 3/003* (2013.01);
(Continued)

(58) Field of Classification Search
CPC ........ G04G 19/00; G04G 21/00; G09G 3/002; G09G 3/003
See application file for complete search history.

(56) References Cited

U.S. PATENT DOCUMENTS

2002/0063855 A1   5/2002  Williams
2009/0046140 A1   2/2009  Lashmet et al.
(Continued)

FOREIGN PATENT DOCUMENTS

KR   1020010051469   6/2001
KR   1020100130478   12/2010

OTHER PUBLICATIONS

PCT International Application No. PCT/KR2014/011062, Notification of Transmittal of the International Search Report and the Written Opinion of the International Searching Authority, or Declaration dated Jul. 24, 2015, 9 pages.

*Primary Examiner* — William C Dowling
(74) *Attorney, Agent, or Firm* — Lee Hong Degerman Kang & Waimey

(57) ABSTRACT

According to one embodiment of the preset specification, a method for controlling a wearable device for displaying visual information on a first display area and on a second display area can comprises the steps of: detecting that the wearable device has been changed to a charging state; displaying first visual information on a first display area; displaying second visual information on a second display area; detecting an event relating to a first application while the wearable device is in a charging state; and displaying, on the second display area, third visual information relating to the first application. At this time, the first visual information of the first display area can be displayed on a display unit of the wearable device, and the second visual information of the second display area can be displayed on the basis of a light source projected outside of the wearable device.

19 Claims, 14 Drawing Sheets

(51) Int. Cl.
*G04G 9/00* (2006.01)
*G09G 3/00* (2006.01)
*H04M 1/02* (2006.01)
*H04N 9/31* (2006.01)

(52) U.S. Cl.
CPC ... *G09G 2320/0261* (2013.01); *H04M 1/0272* (2013.01); *H04M 2250/16* (2013.01); *H04N 9/3173* (2013.01)

(56) References Cited

U.S. PATENT DOCUMENTS

| | | |
|---|---|---|
| 2009/0051832 A1 | 2/2009 | Banks et al. |
| 2018/0219408 A1* | 8/2018 | Gao ........................ G04G 19/00 |
| 2018/0249079 A1* | 8/2018 | Blum ................. H04N 5/23241 |

* cited by examiner

<Front View>

< Side View >

< Front View>

<Side View>

FIG. 7a
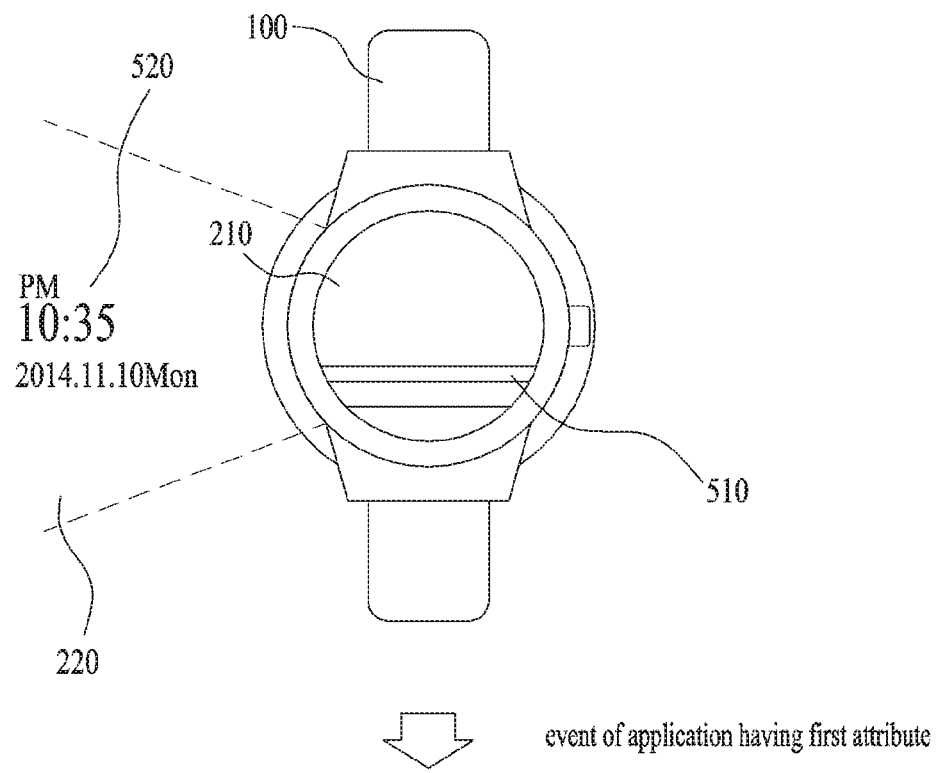
⇩ event of application having first attribute
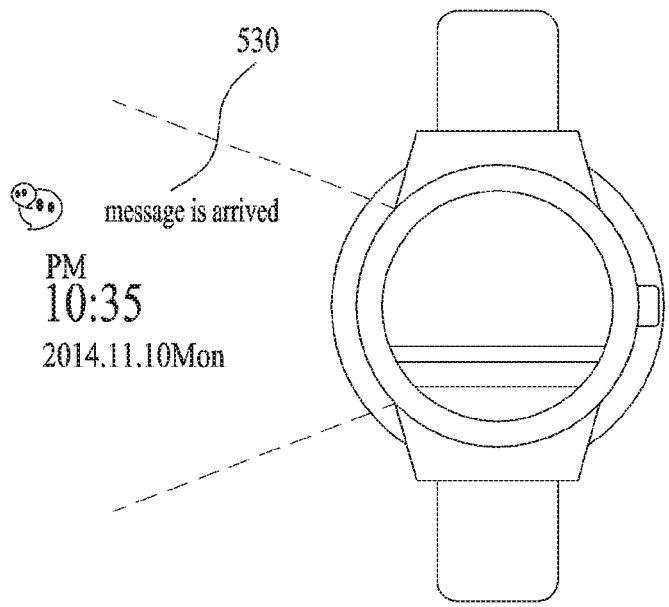

FIG. 7b
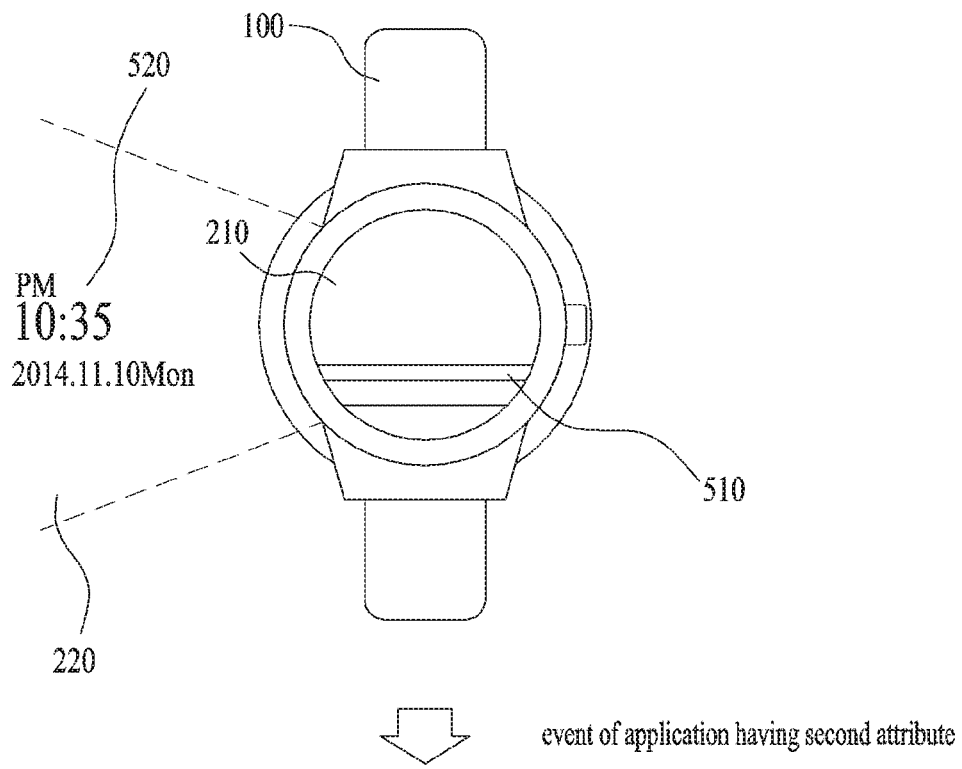
event of application having second attribute
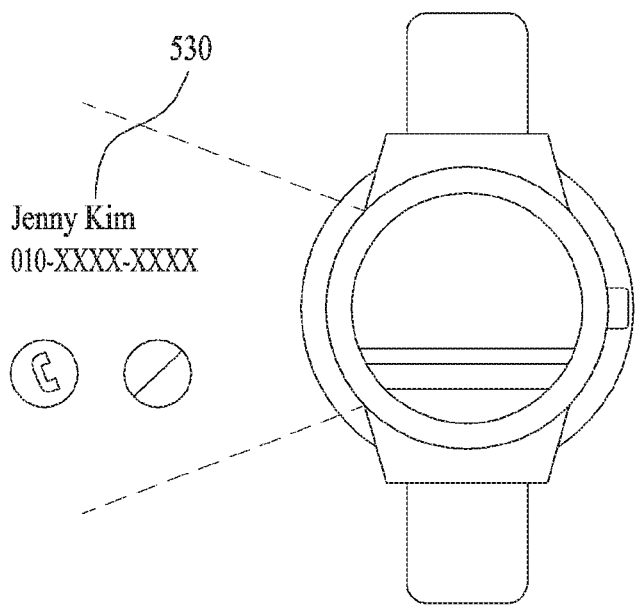

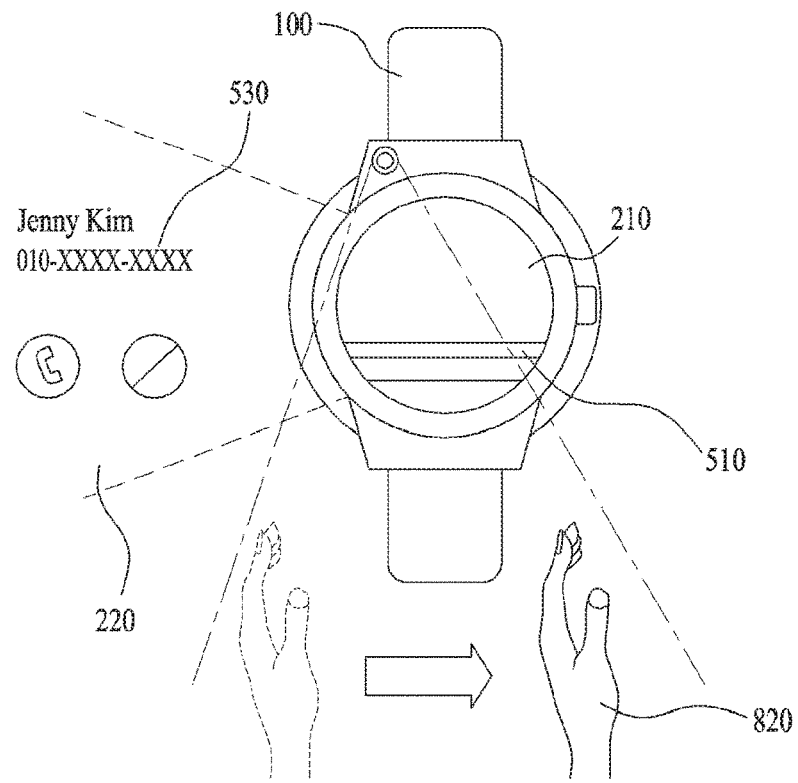
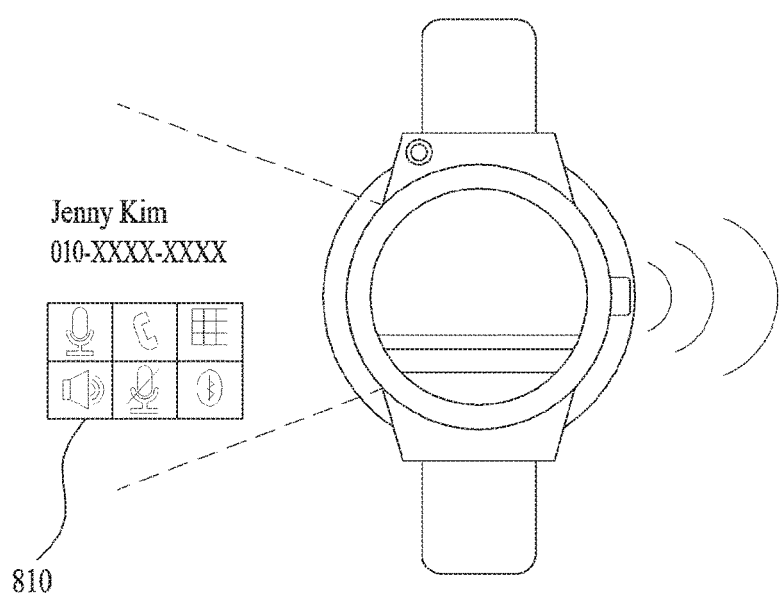
FIG. 8a

FIG. 8b
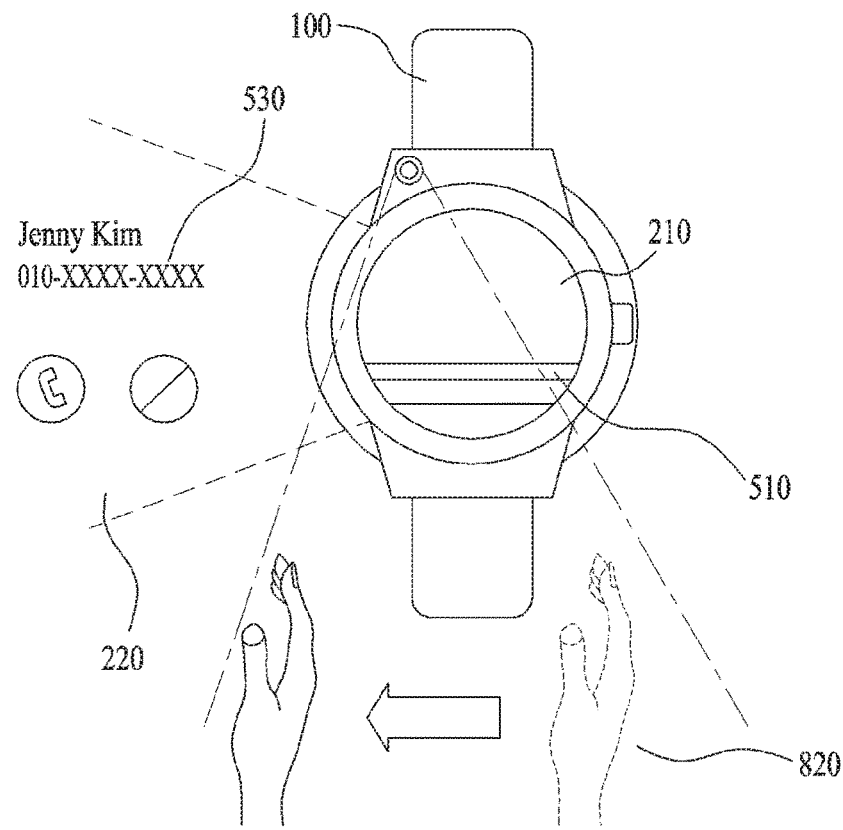
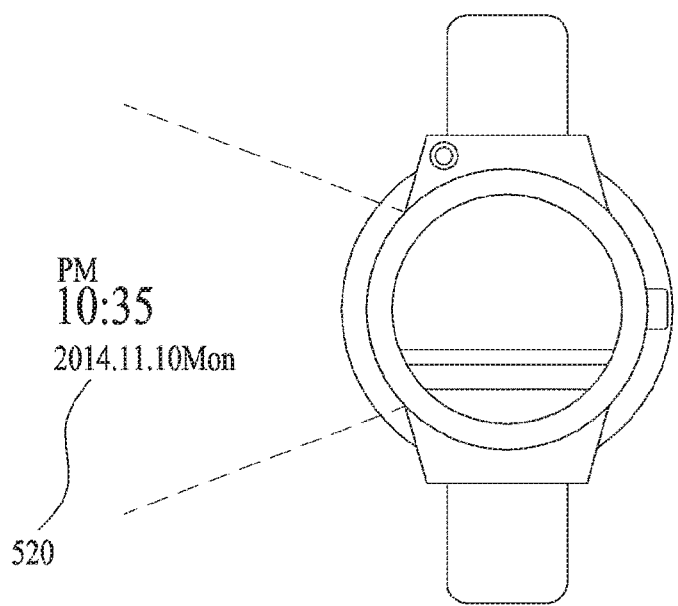

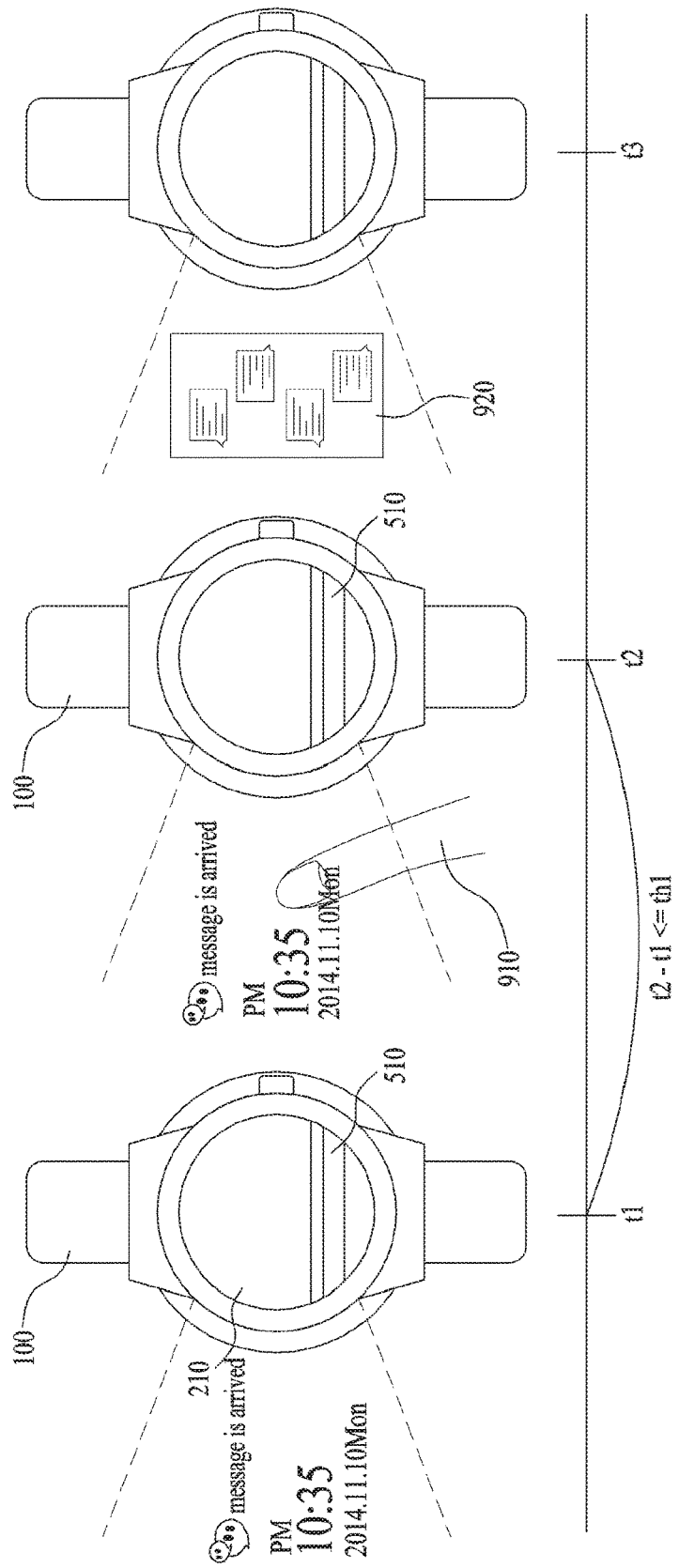

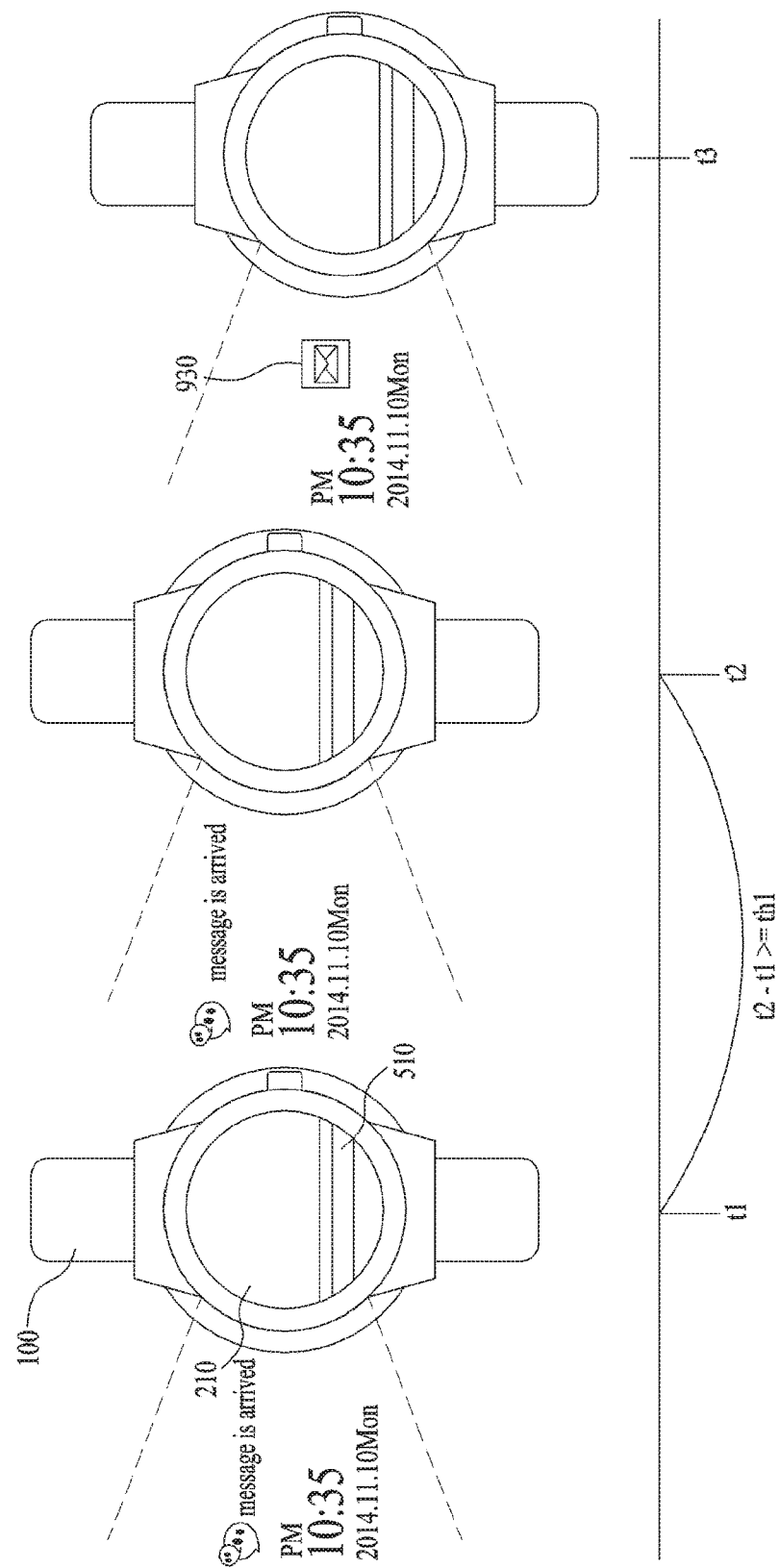

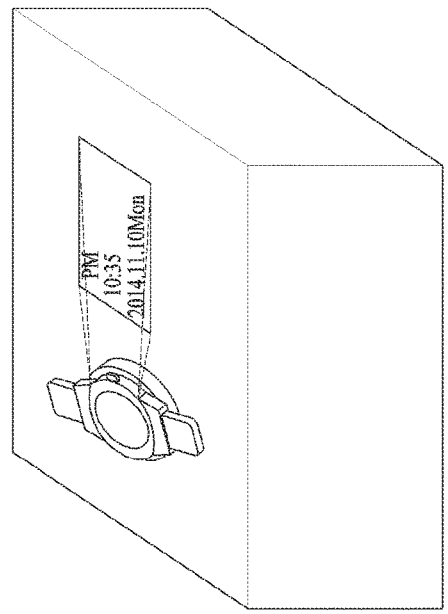
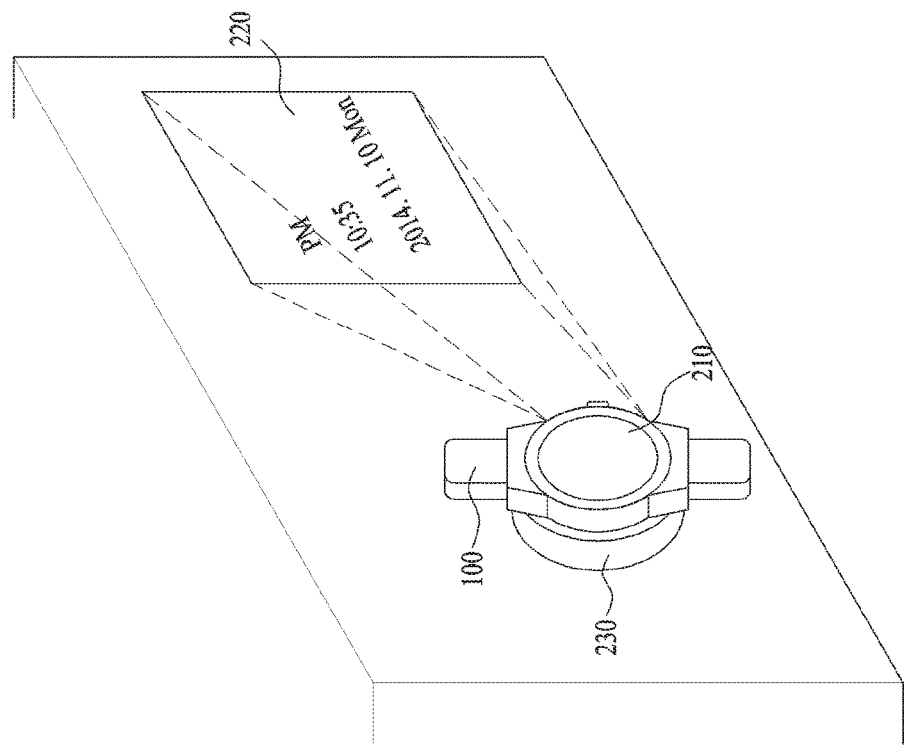
FIG. 10

WEARABLE DEVICE AND CONTROL METHOD THEREFOR

CROSS-REFERENCE TO RELATED APPLICATIONS

This application is the National Stage filing under 35 U.S.C. 371 of International Application No. PCT/KR2014/011062, filed on Nov. 18, 2014, the contents of which are all hereby incorporated by reference herein in its entirety

TECHNICAL FIELD

The present specification relates to a wearable device and a method of controlling therefor.

BACKGROUND ART

Recently, the use of a wearable device is increasing. In this case, the wearable device may correspond to devices including a smart watch, a HMD, and the like. In particular, the wearable device may correspond to a device worn on a user. In this case, the wearable device may have a limitative display area. Hence, it is necessary to have a method of using the wearable device by extending the display area of the wearable device.

DISCLOSURE OF THE INVENTION

Technical Tasks

An object of the present specification is to provide a wearable device and a method of controlling therefor.

Another object of the present specification is to display visual information in a first display area and a second display area of a wearable device.

Another object of the present specification is to display visual information of a first display area by a display unit of a wearable device.

Another object of the present specification is to display visual information of a second display area based on a light source projected to the outside of a wearable device.

Another object of the present specification is to control visual information displayed in a first display area and a second display area when a wearable device changing to a charging state is detected.

Another object of the present specification is to control visual information on an event when a wearable device detects the event related to an application in a charging state.

Another object of the present specification is to detect a charging level of a wearable device and control whether to display visual information based on the charging level.

Another object of the present specification is to control whether to display visual information on an event based on an application attribute.

Another object of the present specification is to detect a gesture input and control whether to display visual information based on the gesture input.

The other object of the present specification is to display charging information and an interface for visual information.

Technical Solution

To achieve these and other advantages and in accordance with the purpose of the present invention, as embodied and broadly described, according to one embodiment, a wearable device displaying visual information in a first display area and a second display area includes a display unit configured to display the visual information in the first display area, wherein the visual information of the second display area is displayed based on a light source projected to the outside of the wearable device, and a processor configured to control the display unit, the processor, if the wearable device changing to a charging state is detected, configured to display first visual information and second visual information in the first display area and the second display area, respectively, the processor, if the wearable device detects an event related to a first application in the charging state, configured to display third visual information related to the first application in the second display area.

To further achieve these and other advantages and in accordance with the purpose of the present invention, according to a different embodiment, a method of controlling a wearable device displaying visual information in a first display area and a second display area, includes the steps of detecting the wearable device changing to a charging state, displaying first visual information in the first display area, wherein the first visual information of the first display area is displayed on a display unit of the wearable device, displaying second visual information in the second display area, wherein the second visual information of the second display area is displayed based on a light source projected to the outside of the wearable device, detecting an event related to a first application in the charging state of the wearable device, and displaying third visual information related to the first application in the second display area.

Advantageous Effects

According to the present specification, it is able to provide a wearable device and a method of controlling therefor.

According to the present specification, it is able to display visual information in a first display area and a second display area of a wearable device.

According to the present specification, it is able to display visual information of a first display area by a display unit of a wearable device.

According to the present specification, it is able to display visual information of a second display area based on a light source projected to the outside of a wearable device.

According to the present specification, it is able to control visual information displayed in a first display area and a second display area when a wearable device changing to a charging state is detected.

According to the present specification, it is able to control visual information on an event when a wearable device detects the event related to an application in a charging state.

According to the present specification, it is able to detect a charging level of a wearable device and control whether to display visual information based on the charging level.

According to the present specification, it is able to control whether to display visual information on an event based on an application attribute.

According to the present specification, it is able to detect a gesture input and control whether to display visual information based on the gesture input.

According to the present specification, it is able to display charging information and an interface for visual information.

DESCRIPTION OF DRAWINGS

FIGS. 7a and 7b are diagrams for a method for a wearable device to display visual information in a second display area based on an attribute of an application according to one embodiment of the present specification;

FIGS. 8a and 8b are diagrams for a method for a wearable device to display visual information based on a gesture input according to one embodiment of the present specification;

FIGS. 9a and 9b are diagrams for a method for a wearable device to display visual information based on a control input according to one embodiment of the present specification;

FIG. 10 is a diagram for a method for a wearable device to display visual information based on a charging place according to one embodiment of the present specification;

BEST MODE

While embodiments are concretely described with reference to the attached diagrams and the contents written on the diagrams, the present specification may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the present specification, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For example, a first configuration element can be referred to as a second configuration element, similarly, the second configuration element can be referred to as the first configuration element while not being deviated from the scope of right according to the concept of the present specification.

In the present application, such a terminology as 'comprise', 'include' and the like should be construed not as excluding existence of a different configuration element but as designating further existence of a different configuration element. In this disclosure, such a terminology as ' . . . unit', ' . . . part' corresponds to a unit for processing at least one or more functions or operations. The unit can be implemented by a combination of hardware and/or software.

Figure 1:
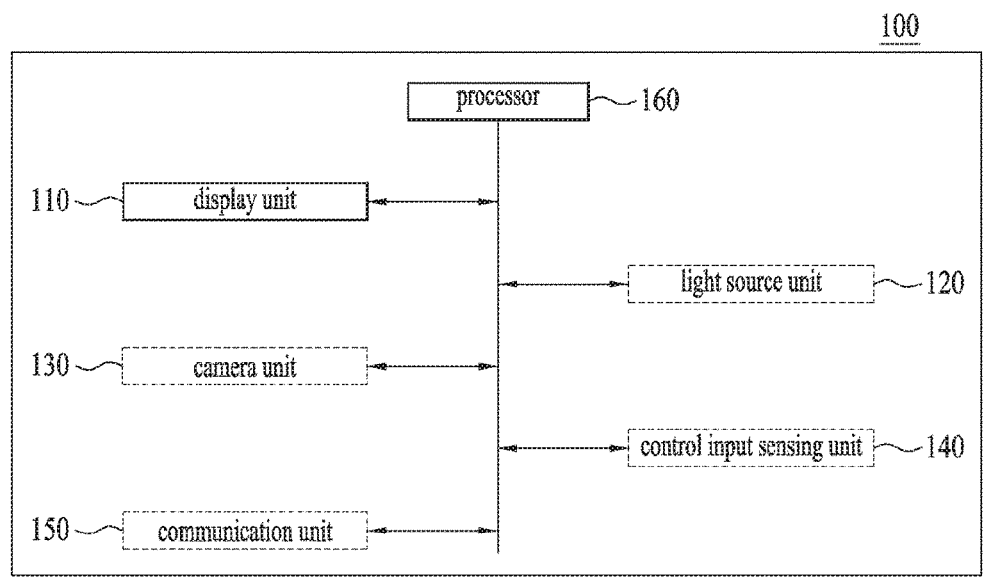
FIG. 1 is a block diagram for a wearable device according to one embodiment of the present specification.

FIG. 1 is a block diagram for a wearable device according to one embodiment of the present specification. In this case, the wearable device 100 may correspond to a device worn by a user. And, the wearable device 100 may correspond to a chargeable device in a manner of being separated from a user. For example, the wearable device is separated from a user and is combined with a charging device to be charged. In this case, for example, the charging device receives power in wired or wirelessly to charge the wearable device combined with the charging device. And, for example, the charging device can be supported by a cradle. In this case, the cradle can be attached to a wall, a desk, or the like. More specifically, the charging device and the wearable device 100 combined with each other are fixed to the wall by the cradle. And, for example, when the wearable device is charged, the wearable device and the charging device combined with each other can be fixed to a desk, or the like. In particular, the wearable device 100 can be charged by a separate charging device in a manner of being separated from a user, by which the present specification may be non-limited. And, for example, the wearable device 100 may correspond to a smart watch, a HMD, a smart lens, or the like. And, for example, the wearable device 100 may correspond to a device of a necklace type. In particular, the wearable device 100 may correspond to a device capable of being worn on a user or being separated from the user, by which the present specification may be non-limited.

The wearable device 100 can include a display unit 110 and a processor 160. The wearable device 100 can further include a light source unit 120 as an optional configuration. The wearable device 100 can further include a camera unit 130 as an optional configuration. The wearable device 100 can further includes a control input sensing unit 140 as an optional configuration. The wearable device 100 can further include a communication unit as an optional configuration. And, for example, the wearable device 100 can further include a location information receiving unit (not depicted), by which the present specification may be non-limited.

The wearable device 100 can include a display unit 110. In this case, as an example, the display unit 110 may correspond to a unit included in the wearable device 100. In this case, the display unit 110 may correspond to a unit controlled by the processor 160. The wearable device 100 can display visual information on the wearable device using the display unit 110. In this case, depending on an embodiment, the display unit 110 can include at least one selected from the group consisting of an OLED (Organic Light-Emitting Diode), an LCD (Liquid Crystal Display), E-ink, a HMD (Head Mounted Display), and a flexible display. In particular, the display unit 110 can display visual information on the wearable device 100 using a unit mounted on the wearable device 100.

The wearable device 100 can include a light source unit 120 as an optional configuration. In this case, the light source unit 120 may correspond to a unit controlled by the processor 160. For example, the light source unit 120 may correspond to a unit for displaying visual information by projecting a light source to the outside of the wearable device 100. As an example, the light source unit 120 may correspond to a small projector. In particular, the wearable device 100 can project a light source to the outside of the wearable device 100 using the light source unit 120 to display visual information. And, for example, the light source unit 120 can include a light source, a panel, a reflection chip, a lens, and the like. In this case, the light source unit 120 can be controlled by the processor 160. As an example, if the processor 160 detects that the wearable device 100 is charging, the processor can display visual information using the light source unit 120. In this case, the light source unit 120 pushes a light source through a panel, reflects the light source to a panel, and projects the light source to the outside of the wearable device 100 via a lens to display visual information. And, for example, the light source unit 120 can be included in a charging device rather than the wearable device 100. And, for example, as a separate device, the light source unit 120 may operate after information is exchanged with the wearable device 100 via communication. Regarding this, it shall be described later with reference to FIGS. 3a and 3b.

The wearable device 100 can further include a camera unit 130 as an optional configuration. In this case, the camera unit 130 may correspond to a unit controlled by the processor 160. For example, the camera unit 130 can detect a front image or a gesture of a user. More specifically, the camera unit 130 captures a surrounding image of the wearable device 100 and converts the image into an electrical signal. To this end, the camera unit 130 can include an image sensor. The image sensor can convert an optical signal into an electrical signal. After the image is captured by the camera unit 130 and is converted into the electrical signal, the image is stored in a storage unit (not depicted) and is outputted by the processor 160. Or, the image can be outputted by the processor without being stored in the storage. The camera unit 130 can detect a gesture of a user located near the wearable device 100. In this case, the gesture may correspond to an input detected by the camera unit 130. In this case, if the processor 160 detects a gesture identical to a predetermined gesture using the camera unit 130, the processor can execute an operation. In particular, it may be able to detect a gesture of a user as an input for controlling the wearable device 100 using the camera unit 130, by which the present specification may be non-limited. Regarding this, it shall be described later with reference to FIGS. 8a and 8b.

The wearable device 100 can further include a control input sensing unit 140 as an optional configuration. In this case, the control input sensing unit 140 may correspond to a unit controlled by the processor 160. The control input sensing unit 140 can forward a user input or environment recognized by the device to the processor 160 using at least one sensor installed in the wearable device 100. More specifically, the control input sensing unit 140 can sense a control input of a user using at least one sensor mounted on the wearable device 100. In this case, the at least one sensor can include such various sensing means capable of sensing a control input as a touch sensor, a fingerprint sensor, a motion sensor, a proximity sensor, an illumination sensor, a voice recognition sensor, a pressure sensor, and the like. The control input sensing unit 160 is a common name of the aforementioned various sensing means. The aforementioned sensors can be included in a device as a separate element or can be included in the device in a manner of being integrated into at least one or more elements. And, for example, the control input sensing unit 140 may correspond to an element integrated with the display unit 110. For example, the display unit 110 may correspond to a touch sensitive display unit 110. In particular, the processor 160 can detect an input inputted on visual information displayed by the display unit 110 via the control input sensing unit 140.

And, the wearable device 100 can further include a communication unit 150. In this case, the communication unit 150 can be controlled by the processor 160. In this case, the communication unit 150 performs communication with an external device using various protocols to transceives data with the external device. For example, the wearable device 100 can receive event information on an application via the communication unit 150. In particular, the wearable device 100 can receive information from an external device using the communication unit 150. And, for example, the wearable device 100 can receive location information of the wearable device 100 using the communication unit 150. And, for example, the wearable device 100 can include a separate location information receiving unit (not depicted). In this case, for example, the location information receiving unit may correspond to a GPS and the GPS can receive location information of the wearable device 100 via a satellite. In particular, the location information receiving unit may correspond to a unit for receiving the location information of the wearable device, by which the present specification may be non-limited.

The processor 160 may correspond to a unit for controlling the display unit. and, the processor 160 may correspond to a unit for controlling at least one selected from the group consisting of the light source unit 120, the camera unit 130, the control input sensing unit 140, and the communication unit 150. More specifically, the processor 160 can display visual information in at least one area of a first display area and a second display area. In this case, for example, visual information of the first display area can be displayed by the display unit 110. In particular, the visual information of the first display area may correspond to visual information displayed on the wearable device 100. And, for example, visual information of the second display area can be displayed based on a light source projected to the outside of the wearable device 100. More specifically, the processor 160 can display visual information in an area not belonging to the wearable device 100. In this case, for example, as mentioned in the foregoing description, the processor 160 projects a light source to the outside of the wearable device 100 using the light source unit 120 to display visual information. For example, the wearable device 100 combined with a charging device can be charged in a state of being hung on the wall. In this case, the processor 160 can display visual information on a wall next to the wearable device 100 using the light source unit 120. In this case, the second display area can be configured as an area to which a light source is projected. For example, the processor 160 can adjust a size of the second display area using the light source unit 120. In particular, the processor 160 configures a range to which a light source is projected and may be able to adjust the size of the second display area based on the configured range. In this case, a size of the visual information can be increased as well. Regarding this, it shall be described later with reference to FIG. 10.

When a state of the wearable device 100 changing to a charging state is detected, the processor 160 can display visual information. In this case, for example, if the state of the wearable device 100 changing to the charging state is detected by the processor 160, the processor 160 can display first visual information in the first display area of the wearable device 100 using the display unit 110. At the same time, the processor 160 can display second visual information in the second display area located at the outside of the wearable device 100 using the light source unit 120. In this case, for example, the first visual information may correspond to visual information which is displayed irrespective of whether or not an event of a first application is detected. More specifically, the first visual information is configured based on whether or not the wearable device is in a charging state only. The first visual information may correspond to visual information not changed by an external event and an application.

In this case, for example, the first visual information may correspond to charging information. In this case, for example, the wearable device 100 can display the charging information in the whole of the first display area. By doing so, a user can receive the charging information via the whole area of the wearable device 100.

As a different example, the wearable device 100 can display a first interface in the first display area as the charging information. And, the wearable device 100 can further display a first indicator on the first interface. In this case, the first interface may correspond to an interface for indicating a charging level of the wearable device 100. And, the first indicator may correspond to an indicator indicating a charging level of the wearable device 100 based on the charging information.

And, for example, the first visual information may correspond to a background screen. And, for example, the second visual information can include at least one selected from the group consisting of a background screen, date, and time information. As a different example, the second visual information may correspond to visual information on a first object. More specifically, the processor 160 can display the first interface in the first display area before the wearable device 100 is switched to a charging state. In this case, the first interface can include a plurality of objects. In this case, a plurality of the objects may correspond to objects for an icon, an application, a data, time, and the like. In this case, the processor 160 can detect a control input for selecting the first object from the first interface. Subsequently, if the wearable device 100 is switched to a charging state, the processor 160 can display second visual information as visual information on the first object. For example, if the first object corresponds to an object for time and date information, the processor 160 can display the time and date information in the second display area as the second visual information.

And, for example, the processor 160 can detect an event for a first application in a state that the first visual information is displayed in the first display area and the second visual information is displayed in the second display area. In this case, the first application may correspond to software executed in the wearable device 100. And, for example, the event may correspond to information received from the external via the communication unit 150. In this case, for example, the event may correspond to SNS, a message, a call signal, or the like. And, for example, the event may correspond to information detected based on a predetermined configuration value. For example, the event may correspond to alarm detected at a predetermined time. In particular, the event is related to the first application, by which the present invention may be non-limited. And, for example, if the event is detected, the processor 160 can further provide a notification. The notification can include at least one selected from the group consisting of a voice notification, a vibration notification, an image notification, and a text notification. A user is able to know that the event is detected via the notification.

If the event related to the first application is detected, the processor 160 can display third visual information related to the first application in the second display area. In this case, the third visual information may correspond to visual information related to the event. For example, if the event corresponds to a message, the third visual information may correspond to summary information or alarm information on the message. In particular, the third visual information may correspond to visual information on the event, by which the present specification may be non-limited.

The aforementioned elements can be included in the wearable device 100 as a separate element or can be included in the wearable device in a manner of being integrated into at least one or more elements.

Figure 2A:
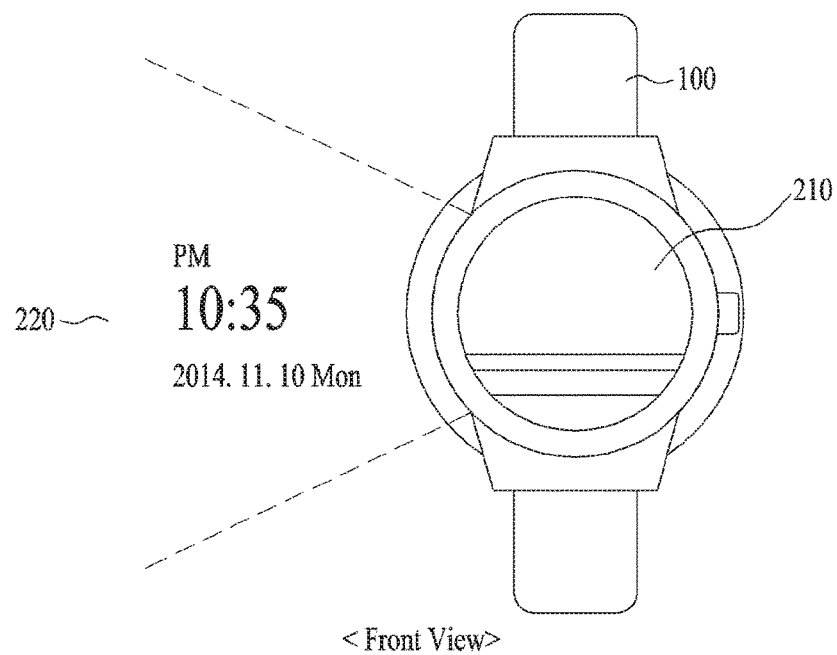
FIGS. 2a and 2b are diagram for a method for a wearable device to display visual information in a second display area according to one embodiment of the present specification.
Figure 2B:
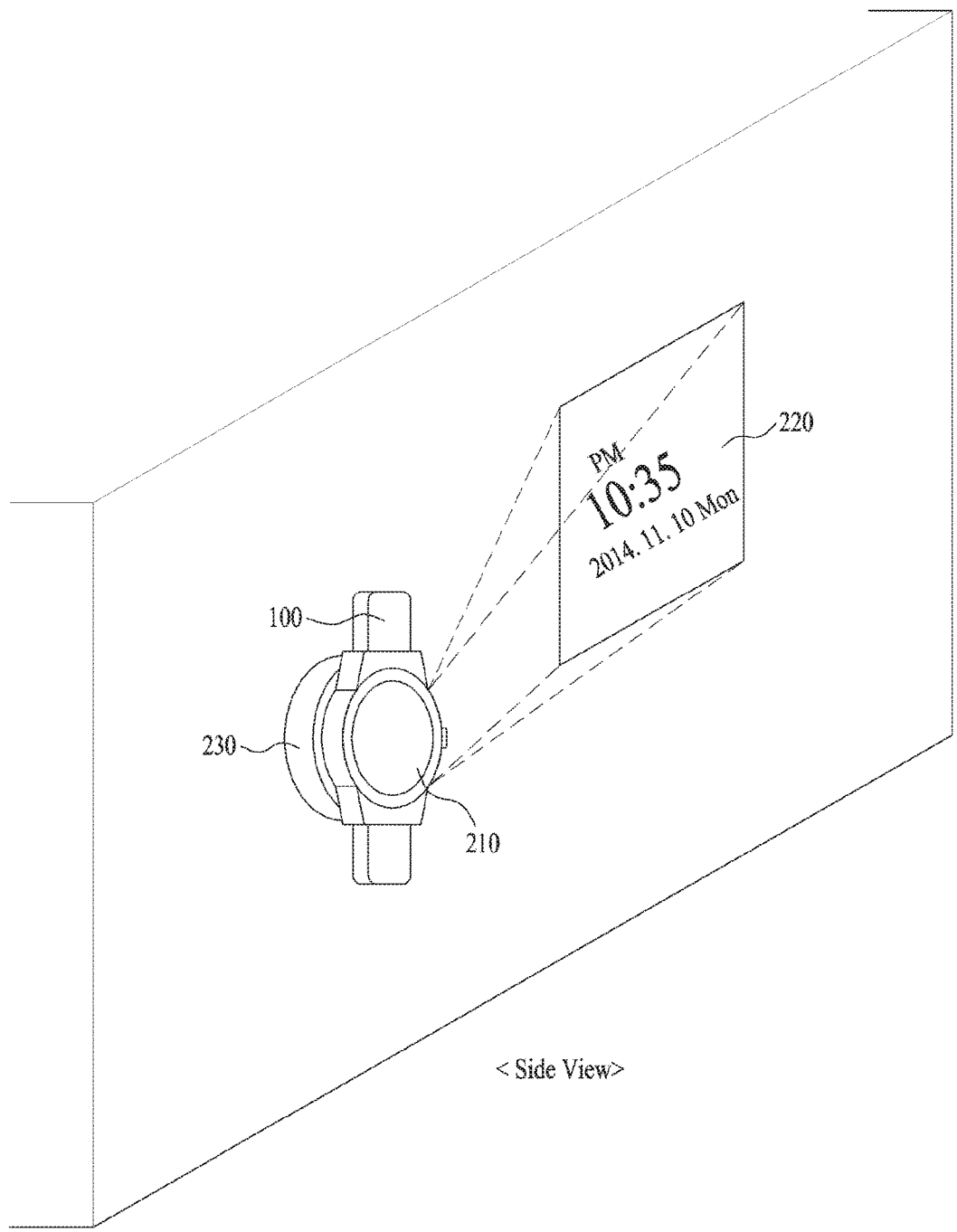

FIGS. 2a and 2b are diagram for a method for a wearable device to display visual information in a second display area according to one embodiment of the present specification. If the wearable device 100 is not in a charging state, the wearable device 100 can display visual information in a first display area 210. In this case, as mentioned in the foregoing description, the first display area 210 may correspond to an area displayed by the display unit 110 of the wearable device 100. And, for example, if the wearable device 100 changing to the charging state is detected, the wearable device 100 can display first visual information in the first display area 210. At the same time, the wearable device 100 can display second visual information in a second display area 220. In this case, the second display area 220 may correspond to an area in which visual information is displayed at the outside of the wearable device 100.

In this case, for example, referring to FIG. 2a, the first visual information may correspond to information on a charging level of the wearable device 100. In particular, the first visual information may correspond to a charging level of the wearable device 100. And, the second visual information may correspond to visual information including information on time, date, and the like. In this case, for example, the wearable device 100 can be charged in a manner of being attached to a wall.

More specifically, referring to FIG. 2b, the wearable device 100 combined with a charging device can be charged in a state of being attached to a wall. In this case, for example, the charging device can be combined with the wall via a cradle. In particular, the wearable device 100 can be attached to the wall using the charging device 230 and the cradle combined with the wall. In this case, the wearable device 100 can set the second display area 220 to the wall. More specifically, if the wearable device 100 is charged in a manner of being attached to the wall, the wearable device 100 can project a light source to the wall using the light source unit 120. In this case, the second display area 220 can be configured as an area at which the light source is arrived. In this case, for example, a size of the second display area can be adjusted. And, a size of the second visual information can be adjusted as well. In particular, the wearable device 100 can control the second display area 220 by controlling a range to which the light source is projected. By doing so, a user can control a size of visual information on the wearable device 100 while the wearable device 100 is charging. And, the user can control the wearable device 100 while the wearable device 100 is charging.

Figure 3A:
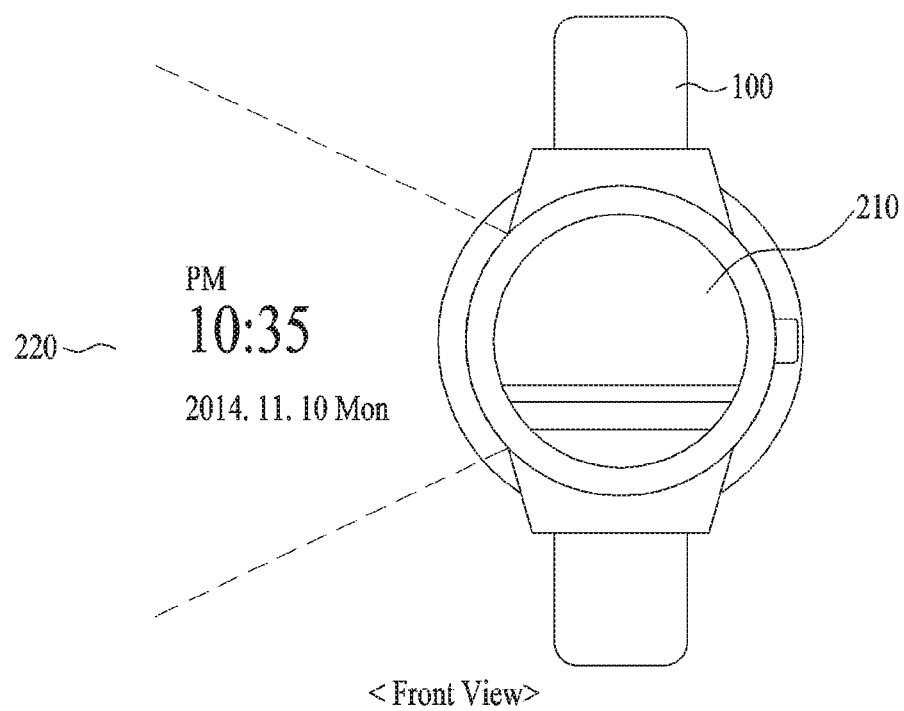
FIGS. 3a and 3b are diagram for a method for a wearable device to display visual information in a second display area according to one embodiment of the present specification.
Figure 3B:
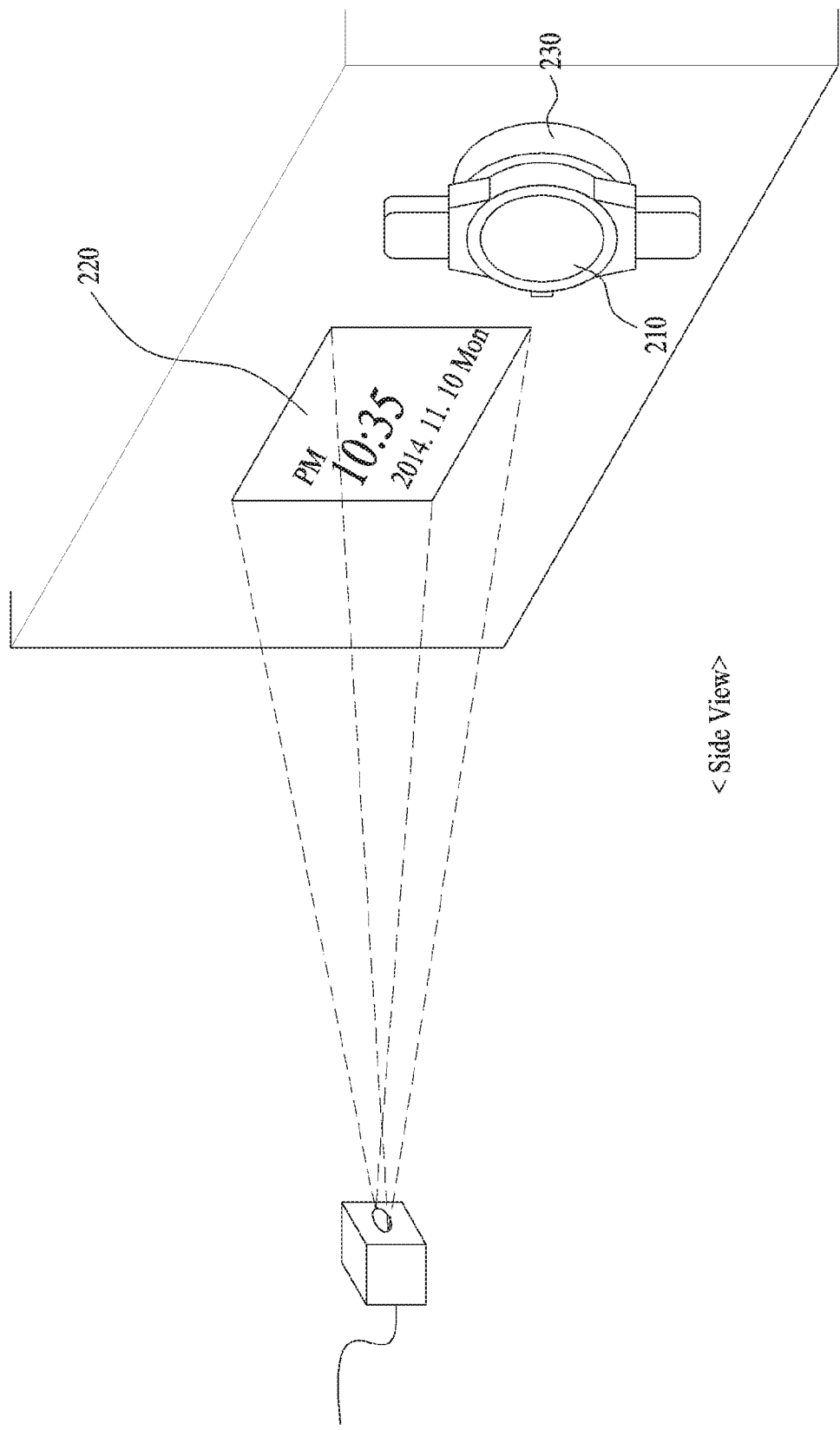

FIGS. 3a and 3b are diagram for a method for a wearable device to display visual information in a second display area according to one embodiment of the present specification. Referring to FIG. 3a, if the wearable device 100 changing to a charging state is detected, the wearable device 100 can display first visual information in a first display area 210.

And, the wearable device 100 can display second visual information in a second display area 220.

In this case, as mentioned in the foregoing description, the second display area 220 may correspond to an area to which a light source is projected at the outside of the wearable device 100. In this case, referring to FIG. 3b, the light source unit 120 may correspond to a separate device not included in the wearable device 100. More specifically, the light source unit 120 may correspond to a separate projector 310. In this case, for example, if the wearable device 100 is switched to a charging state, the wearable device 100 can transmit information on the charging state to the projector. In this case, the projector 310 can set the second display area 220 to an area adjacent to the wearable device 100 based on the received information on the charging state. The projector 310 projects a light source to an area and configures the area to which the light source is projected as the second display area 220. In this case, the wearable device 100 can transmit a signal for the second visual information to the projector 310. The projector 310 can display the second visual information based on the received signal. And, for example, the projector 310 can configure the second display area 220 at an area adjacent to the wearable device 100 via location information of the wearable device 100. And, the wearable device 100 can configure an area configured by a user or the processor 160 as the second display area 220. By doing so, a user can control a size and a configuration area of the second display area 220. As a different example, a light source unit may correspond to a unit attached to a charging device 230 or a cradle. More specifically, if the wearable device 100 is attached to the charging device 230 or the cradle, the charging device 230 can configure the second display area 220 by projecting a light source. In this case, the wearable device 100 can transmit a signal for the second visual information to the charging device 230 or the cradle. The charging device 230 or the cradle can display the second visual information based on the signal received from the wearable device 100.

Figure 4:
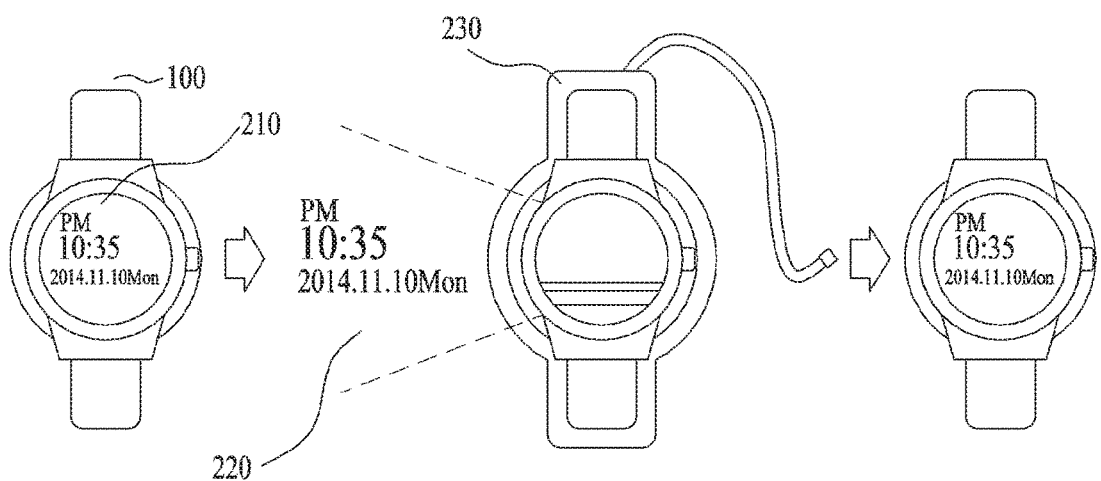
FIG. 4 is a diagram for a method for a wearable device to display visual information in a second display area based on whether or not the wearable device is charged according to one embodiment of the present specification.

FIG. 4 is a diagram for a method for a wearable device to display visual information in a second display area based on whether or not the wearable device is charged according to one embodiment of the present specification. If the wearable device 100 is not in a charging state, the wearable device 100 can display first visual information in a first display area 210. In this case, the first visual information may correspond to background screen information or visual information on a currently executing application. In this case, the wearable device 100 may not configure a second display area 220 in which visual information is displayed based on a light source. In particular, if the wearable device is not in the charging state, the wearable device 100 may not project a light source.

In this case, for example, referring to FIG. 4, if the wearable device 100 changing to the charging state is detected, the wearable device 100 can display the first visual information in the second display area 220. In particular, if the wearable device is switched to the charging state, the wearable device 100 can display the first visual information, which was displayed in the first display area 210, in the second display area 220. In this case, the wearable device 100 can display second visual information in the first display area 210. In this case, the second visual information may correspond to charging information. In particular, if the wearable device 100 changing to the charging state is detected, the wearable device 100 projects a light source to display the first visual information in the second display area 220. In this case, the wearable device 100 can display the charging information in the first display area 210 as the second visual information. In this case, if the charging of the wearable device 100 is terminated, the wearable device 100 can display the first visual information in the first display area again. In this case, the second display area 220 may disappear. In particular, the wearable device 100 can project a light source only when the wearable device 100 is in the charging state and display visual information in the second display area 220. By doing so, a user can control whether to display visual information in the second display area 220 based on whether or not the wearable device is charged.

As a different example, the wearable device 100 can display visual information in the second display area 220 based on a control input for selecting a predetermined object. In this case, the predetermined object may correspond to an icon, an application, or the like. As a further different example, the object may correspond to a physical button. In particular, although the wearable device 110 is not in a charging state, the wearable device 100 can display visual information in the second display area 220 by projecting a light source, by which the present specification may be non-limited.

Figure 5:
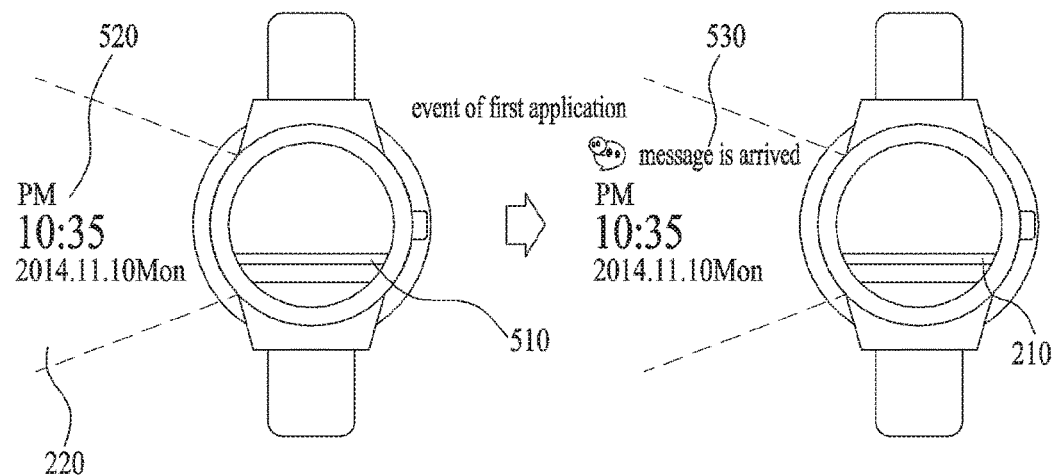
FIG. 5 is a diagram for a method for a wearable device to display visual information based on an event of an application according to one embodiment of the present specification.

FIG. 5 is a diagram for a method for a wearable device to display visual information based on an event of an application according to one embodiment of the present specification. The wearable device 100 can detect that the wearable device is changing to a charging state. In this case, the wearable device 100 can display first visual information 510 in the first display area 210. And, the wearable device 100 can display second visual information in the second display area 220. In this case, the wearable device 100 can detect an event for a first application in the charging state. In this case, the wearable device 100 can display third visual information 530 on the first application. In this case, the third visual information 530 may correspond to visual information on the event. In this case, for example, the third visual information 530 can be displayed in the second display area 220 together with the second visual information 520. And, for example, if the wearable device 100 detects the event for the first application, the wearable device 100 stops displaying the second visual information 520 and may be able to display the third visual information 530, by which the present specification may be non-limited.

For example, referring to FIG. 5, the first visual information 510 may correspond to charging information. And, the second visual information 520 may correspond to background screen information. In particular, the wearable device 100 can display the charging information 510 in the first display area 210 in the charging state. And, the wearable device 100 can display the background screen information information in the second display area 220 in the charging state. In this case, the first application may correspond to a messenger application. And, the event may correspond to a messenger application message received from the external. In this case, the third visual information 530 may correspond to summary information 530 of the messenger application message. In this case, for example, the wearable device 100 can display the summary information 530 of the message while maintaining the background screen. By doing so, a user can check information on the event while charging the wearable device 100.

Figure 6A:
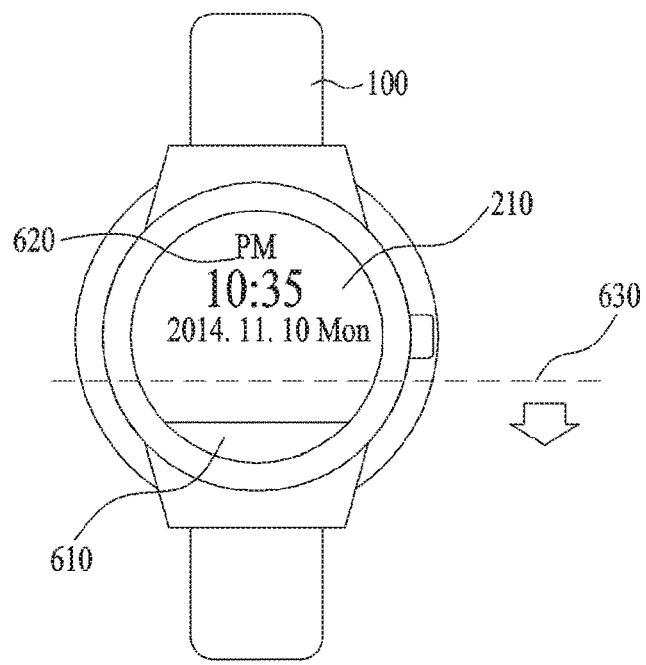
FIGS. 6a and 6b are diagrams for a method for a wearable device to display visual information in a second display area based on a charging level of the wearable device according to one embodiment of the present specification.
Figure 6B:
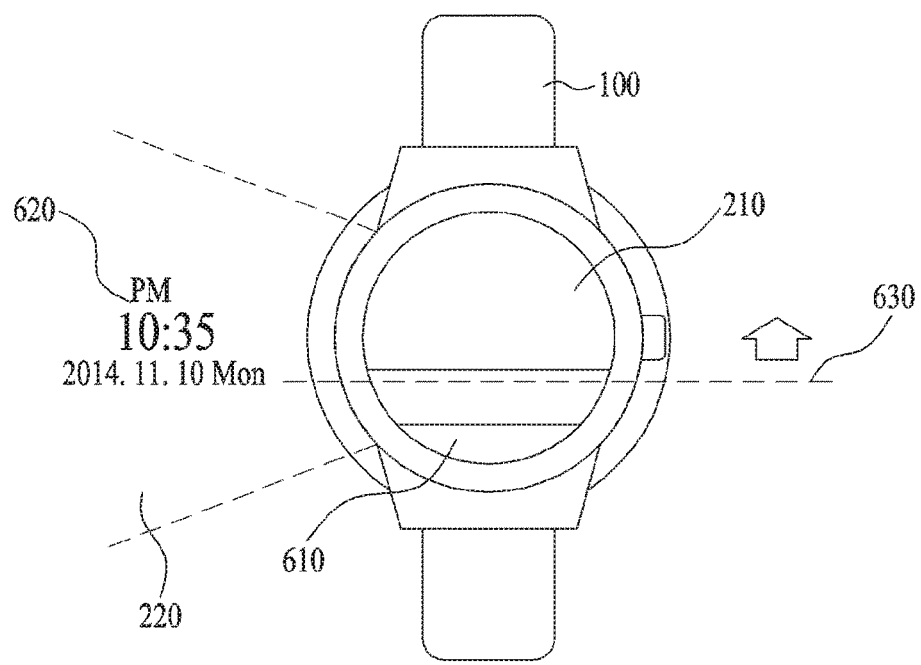

FIGS. 6a and 6b are diagrams for a method for a wearable device to display visual information in a second display area based on a charging level of the wearable device according to one embodiment of the present specification. If the wearable device 100 changing to a charging state is detected, the wearable device 100 can display first visual information 610 in the first display area 210. At the same time, the wearable device 100 can display second visual information 620 in the second display area 220. In this case, the wearable device 100 can further detect a charging level. The charging level may correspond to the extent that the wearable device 100 is charged. In particular, if the wearable device 100 is deeply discharged, the charging level may correspond to 0. And, if the wearable device 100 is fully charged, the charging level may correspond to 100. In this case, for example, if the charging level is equal to or greater than a first threshold level 630, the wearable device 100 can display the second visual information in the second display area 220.

More specifically, referring to FIG. 6a, if the charging level of the wearable device 100 is less than the first threshold level 630, the wearable device 100 can display the first visual information 610 and the second visual information 620 in the first display area 210. In this case, the wearable device 100 may not project a light source. In particular, the wearable device 100 may not configure the second display area 220. In this case, for example, the first threshold level 630 may correspond to a threshold level for determining whether to display the second visual information 620 in the second display area 220. And, the first threshold level 630 can be differently configured by a user or the processor 160 and may have a prescribed error range.

Referring to FIG. 6b, if the charging level of the wearable device 100 is equal to or greater than the first threshold level 630, the wearable device 100 can display the first visual information 610 in the first display area 210. And, the wearable device can display the second visual information 620 in the second display area 220. In particular, when the wearable device 100 detects the charging state, the wearable device 100 can display the second visual information 620 in the second display area 220 only when the charging level is equal to or greater than the first threshold level 630. By doing so, the wearable device 100 can reduce power consumption. Whether or not the second display area 220 is configured by the wearable device 100 can be changed by a user or the processor 160. By doing so, the wearable device 100 can control a charging speed, by which the present specification may be non-limited.

FIGS. 7a and 7b are diagrams for a method for a wearable device to display visual information in a second display area based on an attribute of an application according to one embodiment of the present specification. The wearable device 100 can display the first visual information 510 in the first display area 210 in a charging state. At the same time, the wearable device 100 can display the second visual information 520 in the second display area 220. In this case, if the wearable device 100 detects an event for a first application, the wearable device 100 can display third visual information 530. In this case, for example, the wearable device 100 can control the display of the third visual information 530 based on an application attribute of the first application. In this case, for example, the application attribute can be determined based on a characteristic of the application.

For example, referring to FIG. 7a, if the wearable device 100 detects an event for the first application having a first attribute, the wearable device 100 can display the second visual information 520 and the third visual information 530 at the same time. In particular, the first application having the first attribute may correspond to an application capable of forwarding additional information to a partial area. For example, the first application having the first attribute may correspond to SNS, a messenger, or the like.

As a different example, referring to FIG. 7b, if the wearable device 100 detects an event for a first application having a second attribute, the wearable device 100 stops displaying the second visual information 520 and may be able to display the third visual information 530 in the second display area 220. In particular, the first application having the second attribute may correspond to an application capable of forwarding information on an event to the whole area. In this case, for example, the application having the first attribute may correspond to phone call, alarm, or the like. As a different example, the application attribute of the first application can be differently configured by a user or the processor 160. In particular, the application attribute can be changed. By doing so, a user can differently configure a method of controlling a display area.

FIGS. 8a and 8b are diagrams for a method for a wearable device to display visual information based on a gesture input according to one embodiment of the present specification. The wearable device 100 can display the first visual information 510 in the first display area 210 in a charging state. At the same time, the wearable device 100 can display the second visual information 520 in the second display area 220. In this case, the wearable device 100 can detect a gesture input using the camera unit 130. In this case, for example, the gesture input may correspond to an input for detecting a hand movement of a user. For example, the gesture input may correspond to an input for detecting a head movement of the user. In particular, the gesture input may correspond to a predetermined gesture of the user detected by the camera unit 130, by which the present specification may be non-limited. As a different example, the wearable device 100 can detect a control input using the control input sensing unit 140. In this case, for example, the control input may correspond to an input for touching the display unit 110 of the wearable device 100. As a different example, the control input may correspond to a voice input. In particular, the wearable device 100 may use a voice input as an input for controlling an application and an event.

For example, referring to FIG. 8a, if an event for a first application is detected, the wearable device 100 can display the third visual information 530. In this case, the wearable device 100 can detect a first gesture input. In this case, for example, the gesture input may correspond to an input detected by a hand movement 820 of a user. In this case, the wearable device 100 can execute the first application related to the event based on the first gesture input. The wearable device 100 can display an execution screen 810 of the first application in the second display area 220. In particular, the wearable device 100 can maintain the first visual information 510 in the first display area 210. In this case, the wearable device 100 stops displaying the third visual information 530 in the second display area 220 and may be able to display the execution screen 810 of the first application in the second display area. In particular, the wearable device 100 controls the event using the first gesture input and can display the relevant execution screen 810. As a different example, the wearable device 100 can detect a first voice input. In this case, the wearable device 100 stops displaying the third visual information 530 based on the first voice input and may be able to display the execution screen 810 of the first application. In particular, the wearable device 100 can control an event using a gesture input, a voice input, or the like. And, the wearable device 100 can control an event using an input detected by the control input sensing unit 140, by which the present specification may be non-limited.

As a further different example, the wearable device 100 can detect the termination of the charging of the wearable device 100 using the first gesture input in a state that the first application is executed. In this case, the wearable device 100 can display the execution screen 810 of the first application in the first display area 210. In this case, the wearable device 100 can stop displaying charging information displayed in the first display area 210. More specifically, if the charging of the wearable device 100 is terminated, the wearable device 100 may not display visual information in the second display area 220. In particular, the wearable device 100 does not project a light source in order not to generate the second display area 220. Hence, the wearable device 100 can display the execution screen 810 of the first application, which was displayed in the second display area 220 while the wearable device is charging, in the first display area 210. By doing so, although the charging of the wearable device 100 is terminated, a user can continuously receive execution information of the first application.

And, for example, referring to FIG. 8*b*, if an event for the first application is detected, the wearable device 100 can display the third visual information 530. In this case, for example, the wearable device 100 can detect a second gesture input. In this case, the wearable device 100 can stop displaying the third visual information 530 based on the second gesture input. Subsequently, the wearable device 100 can display the second visual information 520 again. For example, the wearable device 100 can further display fourth visual information (not depicted) associated with the third visual information 530. In particular, the wearable device 100 can forcibly terminate the event of the first application using the second gesture input. For example, the first application may correspond to a call application and the event may correspond to a reception call event. A user can make a call via the first gesture input. And, the user can forcibly terminate the call via the second gesture input. And, for example, the wearable device 100 detects a different input using the control input sensing unit 140 and can control an event based on the detected input, by which the present specification may be non-limited.

And, an application and an event can be executed by a user or the processor 160, by which the present specification may be non-limited.

FIGS. 9*a* and 9*b* are diagrams for a method for a wearable device to display visual information based on a control input according to one embodiment of the present specification. If the wearable device 100 changing to a charging state is detected, the wearable device 100 can display first visual information in the first display area 210. At the same time, the wearable device 100 can display second visual information 520 in the second display area 220. In this case, if the wearable device 100 detects an event for a first application, the wearable device 100 can display third visual information 530 associated with the first application. In this case, the third visual information 530 may correspond to visual information on the event.

In this case, referring to FIG. 9*a*, the wearable device 100 can detect a first input within a first threshold time after the event is detected. In this case, as mentioned in the foregoing description, the first input may correspond to a first gesture input detected by the camera unit 130. In this case, as mentioned in the foregoing description, the first gesture input may correspond to a gesture detected by a hand 910 of a user. And, for example, the first input may correspond to an input detected by the control input sensing unit 140, by which the present specification may be non-limited. In this case, the wearable device 100 can execute a first application based on the first input. And, the wearable device 100 can display an execution screen 920 of the first application in the second display area 220. In particular, the wearable device 100 can maintain the first visual information 510 in the first display area 210. In this case, the wearable device 100 stops displaying the third visual information 530 in the second display area 220 and may be able to display the execution screen 920 of the first application in the second display area. In particular, the wearable device 100 controls the event using the first gesture input and can display the relevant execution screen 920. In this case, for example, the first threshold time may correspond to a threshold time during which the first application is executable. And, the first threshold time can be differently configured by a user or the processor 160 and may have a prescribed error.

As a different example, referring to FIG. 9*b*, if the first gesture is not detected within the first threshold time after the event is detected by the wearable device 100, the wearable device 100 can stop displaying the third visual information 530. Subsequently, the wearable device 100 can display fourth visual information 930 related to the third visual information. In this case, for example, the fourth visual information may correspond to summary information or alarm information indicating that the event is detected. In particular, if an input is not detected within a prescribed time after the event is detected, the wearable device 100 displays relevant visual information and may be able to stop detecting the event.

FIG. 10 is a diagram for a method for a wearable device to display visual information based on a charging place according to one embodiment of the present specification. If the wearable device 100 changing to a charging state is detected, the wearable device 100 can display visual information in the second display area 220. In this case, as mentioned in the foregoing description, the wearable device projects a light source to the outside of the wearable device 100 and can display the visual information in the second display area 220 based on the projected light source.

In this case, referring to FIG. 10, the second display area 220 can be configured based on an area to which the light source is projected. In particular, a size of the second display area 220 and a size of the area at which the light source is arrived can be identical to each other. In this case, for example, the size of the area to which the light source is projected can be controlled by the wearable device 100. In particular, the wearable device 100 can control the size of the second display area 220 and can also control a size of the visual information displayed in the second display area 220. And, for example, the wearable device 100 can control the size of the second display area 220 based on a location to which the wearable device 100 is attached while the wearable device 100 is charging. For example, if the wearable device 100 is charging in a manner of being attached to a wall, the wearable device 100 can configure the second display area 220 by a first size. And, for example, if the wearable device 100 is charging in a manner of being attached on a desk, the wearable device 100 can configure the second display area 220 by a second size. In this case, the second size can be configured to be bigger than the first size. In particular, the wearable device 100 can control the size of the second display area 220 based on the location to which the wearable device is attached for charging.

In this case, for example, the wearable device 100 projects a light source and may be able to configure the size of the second display area 220 based on information on the reflected light source. More specifically, the wearable device 100 can configure the size of the second display area 220 based on a point where the projected light source is changed due to flection of the ground or the wall.

As a different example, if the wearable device 100 is combined with a charging device or a cradle, the wearable device 100 can receive light source projection information from the charging device or the cradle. For example, the light source projection information may change based on a location to which the charging device or the cradle is attached. The wearable device 100 can change the size of the second display area 220 based on the received light source projection information.

In particular, the wearable device 100 can differently configure the size of the second display area 220 according to a location to which the wearable device is attached for charging, by which the present specification may be non-limited.

Figure 11:
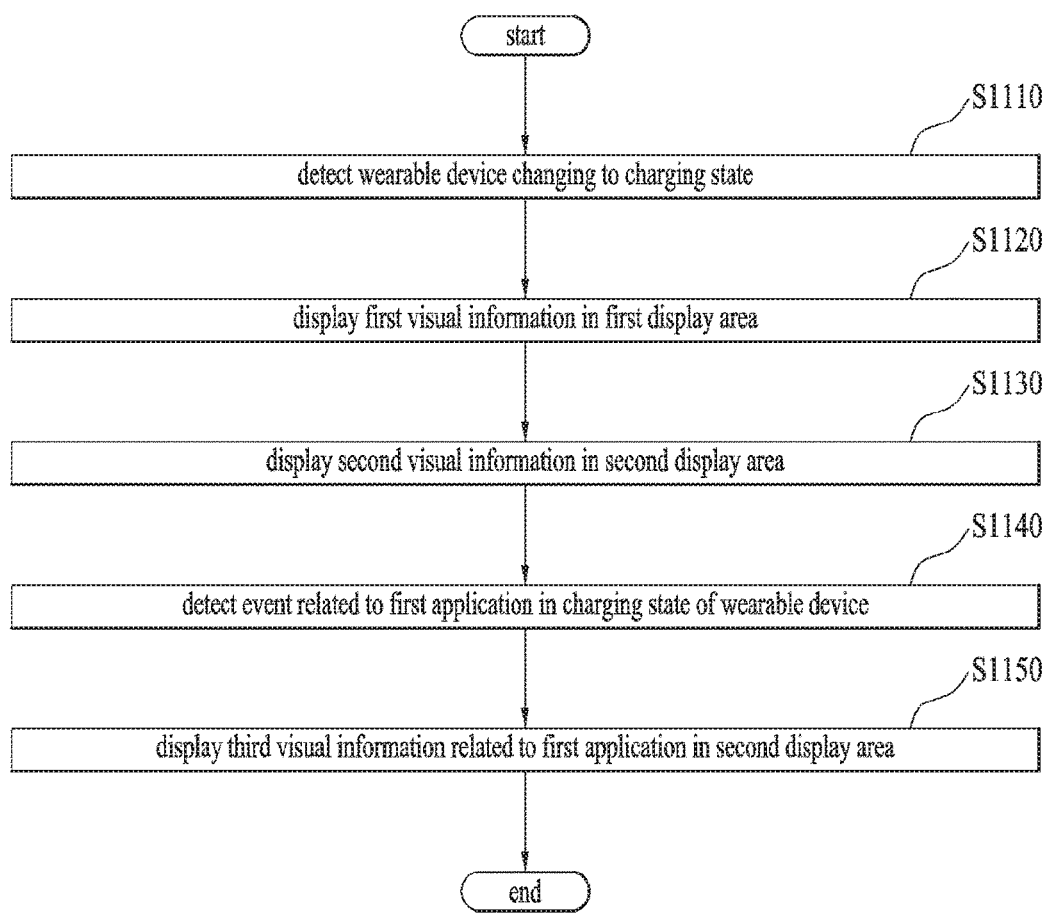
FIG. 11 is a flowchart for a method of controlling a wearable device according to one embodiment of the present specification.

FIG. 11 is a flowchart for a method of controlling a wearable device according to one embodiment of the present specification.

The wearable device 100 can detect that the wearable device is changing to a charging state [S1110]. In this case, as mentioned earlier in FIG. 1, the wearable device may correspond to a device capable of being charged in a manner of being separated from a user. For example, the wearable device can be charged by combining with a charging device in a manner of being separated from a user. In this case, for example, the charging device receives power in wired or wirelessly to charge the wearable device combined with the charging device. And, for example, the charging device can be supported by a cradle. In this case, the cradle can be fixed to a wall, a desk, or the like. More specifically, the charging device and the wearable device 100 combined with each other are fixed to a wall by the cradle. And, for example, the charging device and the wearable device 100 combined with each other can be fixed to a desk to charge the wearable device. In particular, the wearable device 100 can be charged by a separate charging device in a manner of being separated from a user, by which the present specification may be non-limited.

Subsequently, the wearable device can display first visual information in a first display area [S1120]. In this case, as mentioned earlier in FIG. 1, the first visual information of the first display area can be displayed on a display unit 110 of the wearable device. In particular, the first visual information may correspond to visual information displayed on the wearable device. In this case, for example, the first visual information may correspond to visual information which is displayed irrespective of whether or not an event of a first application is detected. More specifically, the first visual information is configured based on whether or not the wearable device is in a charging state only. The first visual information may correspond to visual information not changed by an external event or an application.

Subsequently, the wearable device 100 can display second visual information in a second display area [S1130]. In this case, as mentioned earlier in FIG. 1, the second visual information displayed in the second display area may correspond to visual information which is displayed based on a light source projected to the outside of the wearable device 100. In this case, for example, the wearable device 100 projects the light source using a light source unit 120 and can display the second visual information in the second display area based on the projected light source. In particular, the second visual information may correspond to visual information which is displayed based on the light source projected to the outside of the wearable device 100. And, for example, the second visual information can include at least one selected from the group consisting of a background screen, a date, and time information. As a different example, the second visual information may correspond to visual information on a first object. More specifically, the processor 160 can display a first interface in the first display area before the wearable device 100 is switched to the charging state. In this case, the first interface can include a plurality of objects. In this case, a plurality of the objects may correspond to objects for an icon, an application, a date, time, and the like. In this case, the processor 160 can detect a control input for selecting a first object from the first interface. Subsequently, if the wearable device 100 is switched to the charging state, the processor 160 can display the second visual information as visual information on the first object. For example, if the first object corresponds to an object for time and date information, the processor 160 can display time and date information in the second display area as the second visual information.

Subsequently, the wearable device 100 can detect an event related to a first application in the charging state [S1140]. In this case, as mentioned earlier in FIG. 1, the first application may correspond to software executed in the wearable device 100. And, for example, the event may correspond to information received from the external via the communication unit 150. In this case, for example, the event may correspond to SNS, a message, a call signal or the like. And, for example, the event may correspond to information detected based on a predetermined configuration value. In particular, the event may correspond to information on the first application, by which the present specification may be non-limited. And, for example, if the event is detected, the processor 160 can further provide a notification. In this case, the notification can include at least one selected from the group consisting of a voice notification, a vibration notification, an image notification, and a text notification. A user can check that the event is detected via the notification.

Subsequently, the wearable device 100 can display third visual information related to the first application in the second display area [S1150]. In this case, as mentioned earlier in FIG. 1, if an event related to a first application is detected, the wearable device 100 can display the third visual information related to the first application in the second display area. In this case, the third visual information may correspond to visual information related to the event. For example, if the event corresponds to a message, the third visual information may correspond to summary information or alarm information for the message. In particular, the third visual information may correspond to visual information on the event, by which the present specification may be non-limited. And, for example, the wearable device 100 can display the second visual information and the third visual information at the same time based on an attribute of an application. And, for example, the wearable device 100 stops displaying the second visual information and may be able to display the third visual information, by which the present specification may be non-limited.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A wearable device 100 according to the present specification and a method of controlling therefor are not restrictively applied to the configuration and action of the aforementioned embodiments. Instead, it may be able to have various modifications in a manner that all or a part of the embodiments are selectively combined.

Meanwhile, a wearable device 100 according to the present specification and a method of controlling therefor can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included in the recording media. And, since the recording media readable by the processor are distributed to the computers connected by a network, codes readable by the processor can be stored and executed in a manner of being distributed.

While the present specification has been described and illustrated herein with reference to the preferred embodiments thereof, it may be non-limited to the aforementioned specific embodiment and it will be apparent to those skilled in the art that various modifications and variations can be made therein without departing from the spirit and scope of the invention. Thus, it is intended that the technical idea and prospect of the present specification covers the modifications and variations of this invention.

And, both an apparatus invention and a method invention are explained in the present specification and the explanation on the both of the inventions can be complementally applied, if necessary.

Mode for Invention

INDUSTRIAL APPLICABILITY

The present invention is usable in a user equipment and is applicable to an industry capable of being repeated.

What is claimed is:

1. A wearable device, comprising:
a display;
a light source configured to project visual information for displaying on an external surface; and
a processor configured to:
cause the display to display first visual information and cause the light source to project second visual information in response to the wearable device changing to a charging state; and
cause the light source to project third visual information in response to an event of an application of the wearable device occurring during the charging state, wherein the third visual information is related to the application.

2. The wearable device of claim 1, wherein the processor is further configured to:
cause the light source to project the third visual information in response to the event and further in response to a charging level being equal to or greater than a threshold level.

3. The wearable device of claim 1, wherein the processor is further configured to:
cause the light source to project the second visual information based on an application attribute of the application.

4. The wearable device of claim 3, wherein the processor is further configured to:
cause the light source to project the second visual information and the third visual information at a same area of the external surface in response to the event having a first attribute.

5. The wearable device of claim 3, wherein the processor is further configured to:
stop the projecting of the second visual information and continue the projecting of the third visual information in response to the event having a second attribute.

6. The wearable device of claim 1, further comprising:
a camera configured to capture an image or gesture input.

7. The wearable device of claim 6, wherein the processor is further configured to:
execute the application based on the event in response to receiving of the gesture input within a threshold time after the event is detected.

8. The wearable device of claim 7, wherein the processor is further configured to:
cause the light source to project an execution screen of the application after the executing of the application.

9. The wearable device of claim 8, wherein the processor is further configured to:
cause the display to display the execution screen of the application after the charging state is terminated.

10. The wearable device of claim 7, wherein the processor is further configured to:
stop the projecting of the third visual information when the gesture input is not detected within the threshold time after the event is detected.

11. The wearable device of claim 10, wherein the processor is further configured to:
cause the light source to project fourth visual information, which is related to the third visual information, together with the second visual information, when the projecting of the third visual information is terminated.

12. The wearable device of claim 6, wherein the processor is further configured to:
stop the projecting of the third visual information when a gesture input is detected within a threshold time after the event is detected.

13. The wearable device of claim 1, wherein the first visual information corresponds to visual information, which is displayed irrespective of whether the event of the application is detected.

14. The wearable device of claim 1, further comprising:
a control input sensing unit configured to receive a control input;
wherein the processor is further configured to:
cause the display to display a first interface having a plurality of objects before the wearable device is switched to the charging state; and
cause the light source to project the second visual information when a first control input for selecting a first object from the first interface is detected after the wearable device is switched to the charging state.

15. The wearable device of claim 1, wherein the first visual information includes charging information of the wearable device, and wherein the processor is further configured to:
cause the display to display a first interface indicating the charging information in an entire portion of a display area.

16. The wearable device of claim 15, wherein the processor is further configured to:

cause the display to display a first indicator on the first interface, wherein the first indicator indicates a charging level of the wearable device based on the charging information.

17. The wearable device of claim 1, wherein the processor is further configured to:
provide a notification in response to detection of the event.

18. The wearable device of claim 17, wherein the notification comprises at least one selected from the group consisting of a voice notification, a vibration notification, an image notification, or a text notification.

19. A display method performed at a wearable device having a display and a light source, the method comprising:
displaying, on the display, first visual information and projecting, by the light source, second visual information, both in response to the wearable device changing to a charging state; and
projecting, by the light source, third visual information in response to an event of an application of the wearable device occurring during the charging state, wherein the third visual information is related to the application.

* * * * *